(12) United States Patent
Eccher et al.

(10) Patent No.: US 7,903,350 B2
(45) Date of Patent: Mar. 8, 2011

(54) MAGNIFIER DETACHABLY AFFIXED TO COSMETIC CONTAINER

(76) Inventors: Denise Cecile Eccher, Pebble Beach, CA (US); Tomasino San Paolo, Coarsegold, CA (US); Marie San Paolo, Salinas, CA (US)

( * ) Notice: Subject to any disclaimer, the term of this patent is extended or adjusted under 35 U.S.C. 154(b) by 40 days.

(21) Appl. No.: 12/290,470

(22) Filed: Feb. 2, 2009

(65) Prior Publication Data

US 2010/0195222 A1    Aug. 5, 2010

(51) Int. Cl.
*G02B 27/02*    (2006.01)

(52) U.S. Cl. ......................... 359/802; 359/804

(58) Field of Classification Search .................. 359/804, 359/802; 132/316, 318
See application file for complete search history.

(56) References Cited

U.S. PATENT DOCUMENTS

| 6,769,438 B2 * | 8/2004 | Fraillon | 132/301 |
| 2005/0150513 A1 * | 7/2005 | Taylor | 132/316 |
| 2009/0146861 A1 * | 6/2009 | Liou et al. | 341/176 |
| 2010/0025285 A1 * | 2/2010 | Campbell et al. | 206/581 |

\* cited by examiner

*Primary Examiner* — Ricky L Mack
*Assistant Examiner* — James C Jones

(57) ABSTRACT

A cosmetic magnifying lens or mirror is disclosed which is capable of being detachably affixed to a conventional cosmetic container, such as mascara. The magnifying lens or mirror may further be adapted to fit over cosmetic containers having a variety of shapes and sizes, and may be reused when the container is empty.

20 Claims, 3 Drawing Sheets

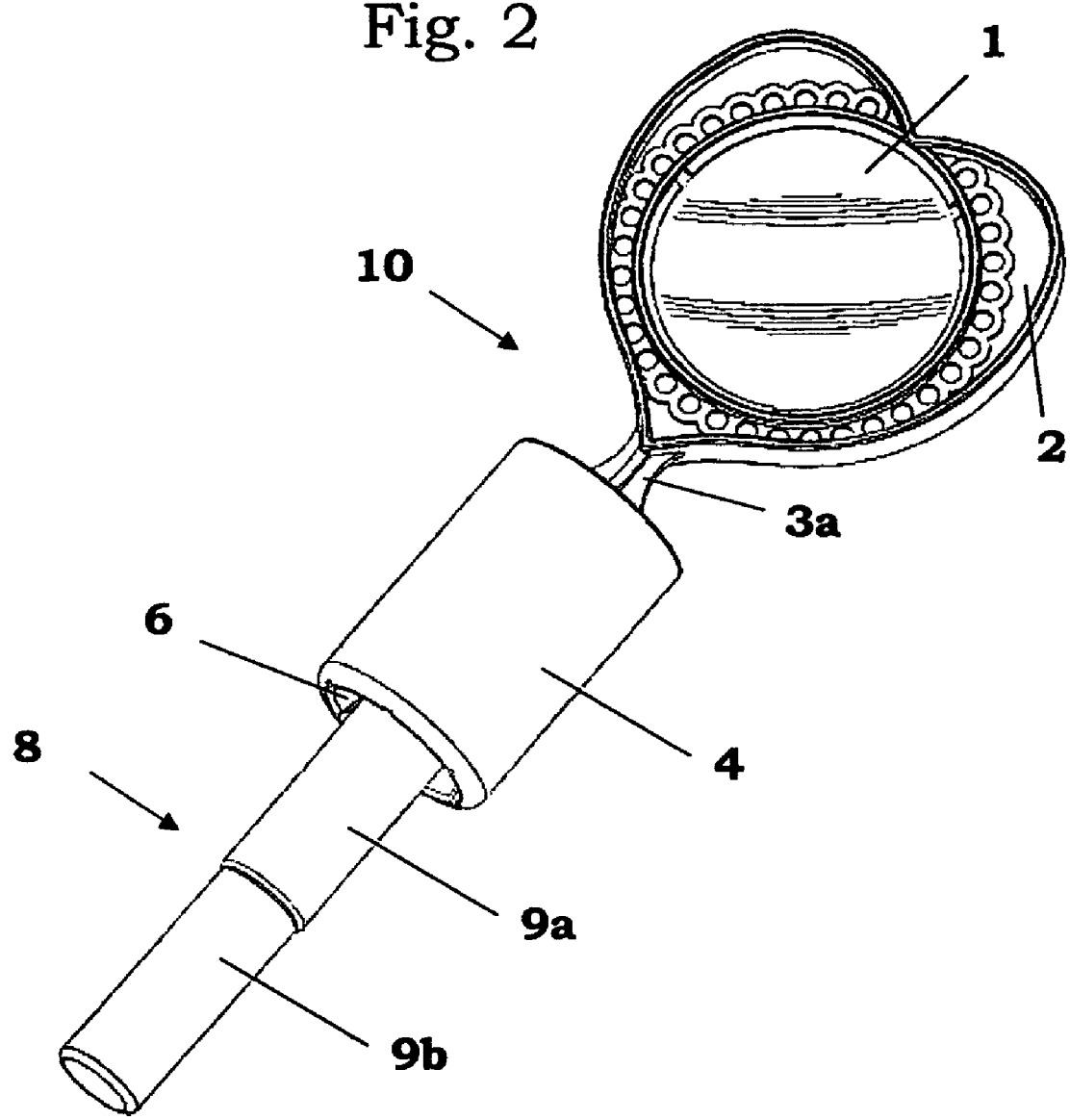

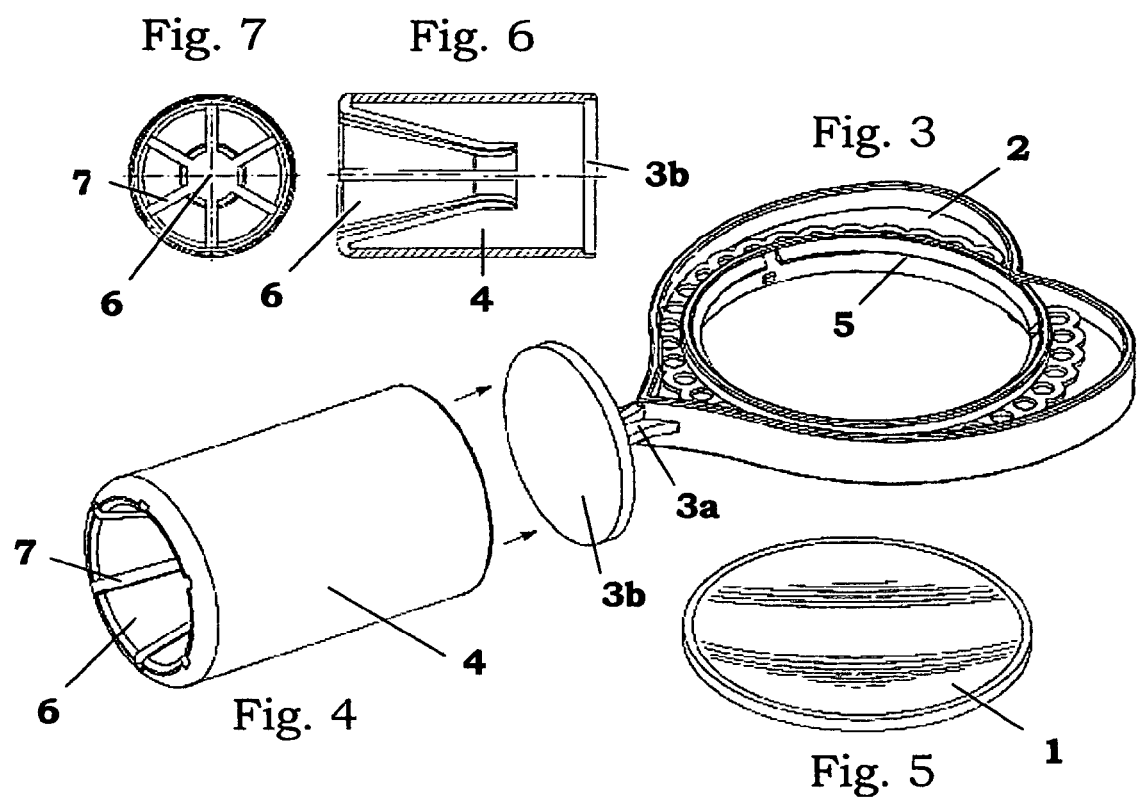

MAGNIFIER DETACHABLY AFFIXED TO COSMETIC CONTAINER

BACKGROUND

1. Field of the Invention

The present invention relates to the application of cosmetics, specifically to a magnifying lens made for a mascara container, or similar cosmetic container, customized to fit, and detachably affixing onto the cosmetic container cap.

2. Description of Prior Art

A significant segment of the female population wears mascara, applied from a portable carrier having a base containing the mascara and a cap which both serves as a handle for the brush-like mascara wand, and as a cover that fits over the base and protects the mascara from contaminants. Such mascara carriers are convenient, as they are small, may be easily carried in a pocket or purse, and can be applied pretty much anytime and anywhere. As it is desirable to have mascara carefully applied onto the eyelashes, it is generally desirable to have a mirror available during the mascara application to ensure the mascara is applied only to the desired areas. However, a significant portion of the female population, especially those over the age of 40 whose eyesight makes it increasingly difficult to view and work with objects up close, finds it difficult to apply mascara using a conventional mirror without some form of magnification.

The process of applying mascara requires two hands—one to hold the base containing the mascara, and one to hold the wand for repeatedly dipping into the base and then applying to the lashes. Most public mirrors are not magnified, and public facilities generally do not offer magnified mirrors for make-up application. And if attempting to use a personal, hand-held magnifying mirror, or compact, while holding the mascara wand in one hand, and holding the mirror in the other hand, one must put down the mirror and pick up the base, so as to re-dip the wand therein, then put down the base and pick up the mirror again to continue. And one must then repeat this cumbersome series of picking up and putting down each time the wand needs to be re-dipped into the mascara. Thus, the need for magnification complicates the mascara application process, wherever a hands-free magnification device situated at eye level is not conveniently available, as is often the case at home, and almost always the case in public.

It is known in the prior art to provide a magnifying mirror within a cosmetic compact. A recent example, U.S. Pat. No. D331,818, discloses a design for a compact and magnifying lens, entitled "Combined Cosmetic Compact and Magnifying Lens." The trouble with such devices however, is that when applying mascara, one requires either a third hand, or a surface very close to eye level, in order to hold the mirror so that it may be used without having to constantly pick it up and put it down. Such devices are primarily designed to be held in the hand, and when placed on a table or shelf, even though the mirror may be angled, they are still difficult to use discretely and graciously, and their use is restricted to the location of the shelf or table surface, however distant or inconvenient.

Further prior art makes use of a mirror affixed directly to the end of the cap of a cosmetic carrying case. For example, U.S. Pat. No. 5,860,755 to Bunk entitled, "Lipstick Holder With Mirror" discloses a lipstick holder having a cylindrical cap with a round mirror affixed to an end portion of the cap. The mirror is either fixedly mounted to the cap, or rotatably mounted at an eccentric point to rotate away from the footprint of the cap. While providing some benefit in allowing a user to view the lipstick as it is being applied, this design has drawbacks in that the mirror is relatively small and furthermore, it is attached to the lipstick cap. Therefore, when the lipstick in the carrier has been used up, the mirror must be thrown away along with the lipstick base and cap. And if this type of prior art were applied to a mascara tube, with the mirror at the end of the base that holds the mascara, the mirror would be impossibly small, given how thin mascara containers are typically designed. Also, the mirror would be impossible to view while applying mascara with the wand and holding the base ready for dipping, unless one were to constantly change hand positions.

Similar prior art features a mirror along the edge of the carrier, as opposed to on the end. U.S. Pat. No. D431,323 to Mills-Kaplan, entitled "Cosmetic Container With Mirror," is just one example, disclosing a lipstick holder with a mirror recessed and built into the length of the side of the container. Again, the drawbacks to this style of cosmetic mirror are similar to the first kind of prior art cited. The mirror must be thrown away when the cosmetic is finished. And the size of the mirror is limited to the diameter of the container, which in the case of mascara especially, would be impossibly thin.

Another prior art invention offers yet another solution to the cosmetic mirror problem. Pub. No. 20040173235 to Kim, provides a lipstick accessory that attaches and detaches easily to various types of cosmetic containers, entitled, "Decorative Mirrored Lipstick Attachment." The invention discloses a devise resembling a wrist watch, with a mirror attached in the back to an elastic band which slips over a lipstick tube or similar cosmetic container. This design overcomes some key drawbacks with the previously cited styles of prior art. The mirror need not be thrown away when the cosmetic is used up. The size of the mirror is not limited to the diameter of the container. The apparatus is also adaptable to various sized containers. However, this particular application does not claim the use of a magnifying mirror, nor a lens, nor could a lens be substituted for the mirror in this design, as the mirror is attached to the elastic band on the back, and thus if a transparent lens were used, the view through the lens would be completely obscured by the band.

Another prior invention, U.S. Pat. No. 5,909,740 to Sussman, discloses a "Protective Cap And Mirror Unit For Cosmetic Pencil." In this design, a mirror is affixed to a tube-shaped cap, which slides over the pointed end of a cosmetic pencil. The drawback of this invention is that its claims and use are limited to pencils. It is not adaptable to various sized containers. Also, it does not claim the use of a magnifying mirror, nor a lens, nor could a lens be substituted for the mirror in this design, as the mirror is attached to the tube-shaped cap directly on the back, and thus if a transparent lens were used, the view through the lens would be completely obscured by the cap.

A final prior art reference, Pub. No. 20050150513 to Taylor, is entitled "Cosmetic Mirror Detachably Affixed To Lipstick Carrier." The invention discloses a mirror attached to a base. The base has an aperture that accommodates various sized cosmetic containers, and the mirror is part of a lid or cover that can be opened and closed against the base to protect the mirror when not in use. In an alternative embodiment, the mirror may be housed within a slot for storage, and withdrawn from the slot for use. Like Pub. No. 20040173235 to Kim, this invention has a mirror, and features adaptability and reusability, without restricting the size of the mirror to the size of the cosmetic container. However, it too does not claim the use of a magnifying mirror, only a plain mirror. Nor does it propose or claim the use of a magnifying lens. With no suitable means of magnification, this invention is of no use to the class of women for whom the present invention is intended.

OBJECTS AND ADVANTAGES

Accordingly, several objects and advantages of the present invention are:
(a) to provide a cosmetic magnifying lens or mirror which detachably fits onto a cap of a mascara container;
(b) to provide a cosmetic magnifying lens or mirror which need not be discarded with the cosmetic container when the cosmetic is all gone and may instead be reused;
(c) to provide a cosmetic magnifying lens or mirror that adapts to a variety of shapes and sizes of cosmetic containers, such as lipstick, mascara, or lip gloss;
(d) to provide a cosmetic magnifying lens or mirror that is not restricted to or limited by the size of the cosmetic container itself;
(e) to provide a cosmetic magnifying lens or mirror which magnifies the area where make-up is being applied, that is convenient and portable, attachable to the cosmetic container such that some sort of surface or mount is not necessary to hold it at eye level, reusable, not restricted to or limited by the size of the cosmetic container itself, and adaptable to a variety of shapes and sizes of cosmetic containers.

DRAWING FIGURES

The present invention will now be described with reference to the drawings in which:

FIG. 2 is a perspective drawing showing a fully assembled detachable cosmetic magnifying lens or mirror, affixed to a mascara tube.

FIG. 3 shows just the frame of a detachable cosmetic magnifying lens or mirror, without the lens or mirror itself.

Figure 1:
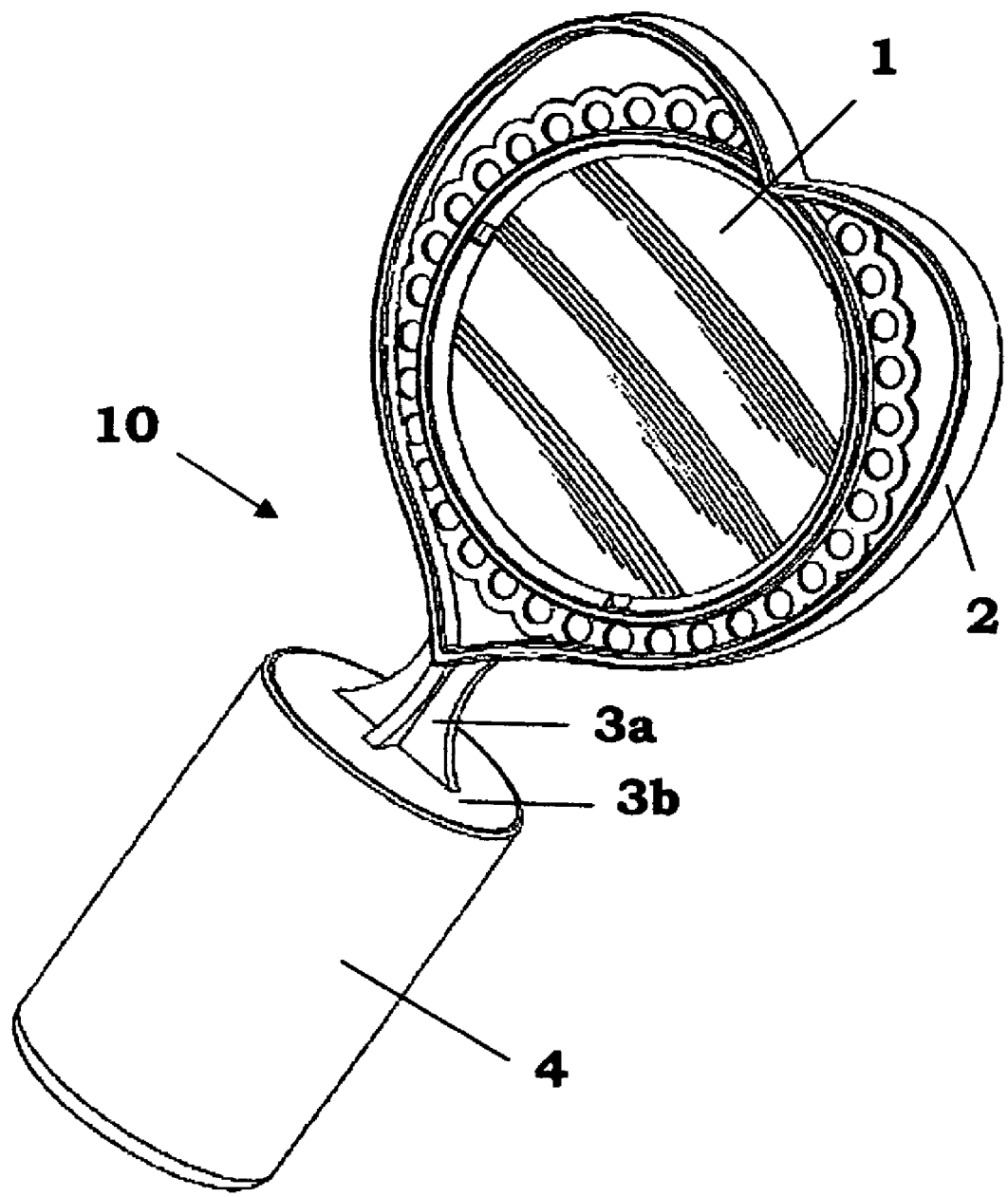
FIG. 1 is a perspective drawing showing a fully assembled detachable cosmetic magnifying lens or mirror.

FIG. 4. shows the base of a detachable cosmetic magnifying lens or mirror, with a view inside the aperture.

FIG. 5. shows the magnifying lens or mirror of a detachable cosmetic magnifying lens or mirror.

FIG. 6. shows an exposed cross section of the base of a detachable cosmetic magnifying lens or mirror, revealing a conically shaped aperture which can accommodate various sizes of cosmetic containers.

FIG. 7. shows the base of a detachable cosmetic magnifying lens or mirror, as viewed directly into the aperture of said base.

| Reference Numerals In Drawings | |
| --- | --- |
| 1 | lens or mirror |
| 2 | frame |
| 3a | stem |
| 3b | stem base |
| 4 | base |
| 5 | groove |
| 6 | aperture |
| 7 | channel |
| 8 | cosmetic container |
| 9a | cosmetic base |
| 9b | cosmetic cap |
| 10 | cosmetic magnifying lens or mirror |

SUMMARY OF THE INVENTION

In accordance with the present invention, a cosmetic magnifying lens or mirror comprises a base having an aperture, a frame attached to said base which houses a magnifying lens or mirror, the lens or mirror being capable of being detached from a first cosmetics container and reused with a second cosmetics container.

DETAILED DESCRIPTION

The present invention will now be described with reference to FIGS. 1 through 7, which in general relate to a cosmetic magnifying lens or mirror which detachably fits onto the cap of a conventional mascara carrier. It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications, and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Referring now to FIG. 2, there is shown a cosmetic magnifying lens or mirror 10 according to the present invention for use with a conventional cosmetic container 8. The cosmetic container includes a cosmetic base 9a in which the cosmetic is housed, and a cosmetic cap 9b which fits on top of the base to protect the cosmetic from dirt and other contaminates, and which in the case of mascara houses the brush-like wand for application to the face. Cosmetic container 8 may be of a conventional design and manufactured for example by Revlon of New York, N.Y.; Maybelline of Clark, N.J.; Avon Products of New York, N.Y., and a wide variety of other known cosmetics manufacturers. Those manufacturers provide cosmetic containers 8 typically having a circular footprint. However, as explained hereinafter, it is known that cosmetic carriers have a variety of different shapes and sizes and cosmetic magnifying lens or mirror 10 may be adapted to detachably fit each such shape and size.

In particular, cosmetic magnifying lens or mirror 10 includes a central aperture 6 which is sized to fit snuggly over the base 9a of container 8. Aperture 6 may be of different sizes and shapes in alternative embodiments to match the different sizes and shapes of existing or future cosmetic container caps. In the embodiment shown in FIG. 2, and again in FIGS. 4, 6 and 7, aperture 6 is cylindrical so as to fit over cylindrical base 9a. The walls defining aperture 6 may be lined with a material, such as for example rubber, for providing a frictional engagement with cap 9a. Other materials for providing a frictional engagement with cap 9a are contemplated. In a further embodiment, the walls defining aperture 6 may be of the same material as base 4, but have a slightly rough texture to provide an increased frictional contact with base 9a. However, it is understood that the walls defining aperture 6 may have a smooth surface and still have the desired frictional contact with base 9a in alternative embodiments. In embodiments of the invention, the frictional force between the cosmetic magnifying lens or mirror 10 and base 9a is preferably greater than a frictional force between the cosmetic cap 9b and cosmetic base 9a. It may be otherwise however in alternative embodiments. Base 9a may fit almost entirely within aperture 6, or may protrude slightly therefrom as shown for example in FIG. 2.

Cosmetic magnifying lens or mirror 10 is preferably formed of base 4 fitting over cosmetic base 9a as explained above, with base 4 being attached to a frame 2. The base and frame may be formed of various lightweight durable materials such as for example cardboard covered with paper. The paper, as well as most of the other materials from which the cosmetic magnifying lens or mirror 10 are formed, may be recycled and/or environmentally friendly such as for example the paper and materials manufactured by Custom Paper Tubes, Inc., 15900 Industrial Parkway, Cleveland, Ohio 44135. Other types of paper are contemplated. Additionally, base 4 and frame 2 may be formed of other lightweight durable materials such as for example plastic in alternative embodiments. It may further be formed of plastic covered by paper. Whether paper, plastic, or other material, the exposed surfaces of base 4 and frame 2 may include an aesthetically pleasing pattern thereon.

Referring now to FIG. 1, in embodiments of the present invention where the outer surface of base 4 and frame 2 are formed of plastic, frame 2 may be connected to base 4 by way of a stem 3a which is connected to a stem base 3b. It is contemplated that there are numerous methods for attaching frame 2 to base 4, and stem 3a and stem base 3b are merely one possible embodiment of such a method of attachment. Stem 3a and stem base 3b may be made of the same material as frame 2 and base 4, or of different materials, and may take on a variety of shapes and sizes.

Referring now to FIGS. 1, 3, and 5, cosmetic magnifying lens or mirror 10 further includes a magnifying lens or mirror 1 mounted in frame 2 by way of a groove 5. It is contemplated that there are numerous methods for attaching lens or mirror 1 to frame 2, and that groove 5 is merely one possible embodiment of such a method of attachment. As it is known in the art, lens or mirror 1 may be formed from various materials such as for example glass or plastic. In embodiments of the invention, lens or mirror 1 may be removable from frame 2 to allow changing or replacement of the lens or mirror 1 within frame 2. In the preferred embodiment, lens or mirror 1 has a magnifying power of 2×, however any power of magnification that is practicable may be employed.

As indicated above, aperture 6 may be shaped to accommodate any of various known shapes and sizes of conventional cosmetic containers. FIGS. 1, 2, 4, 6, and 7 all illustrate embodiments where the container is circular. In all cases, regardless of shape, the aperture 6 conforms to the shape of the cosmetic base 9a and not necessarily to the shape of the cosmetic cap 9b, where cap 9b for example differs in shape from base 9a.

In the embodiments described thus far, the aperture 6 has a shape which matches base 9a. In a further alternative embodiment, aperture 6 may have a single universal shape such as for example circular, oval, square, rectangular, or triangular, and further include a pliable foam rubber lining capable of receiving cosmetic containers of different shapes which deform the foam rubber upon insertion into base 4 and are thus held securely within aperture 6.

Referring now to FIG. 6 and the cross-sectional view of base 4, aperture 6 may vary along its length to become more narrow toward the back of aperture 6. This embodiment may be used to grip cosmetic bases 9a of different diameters. In particular, a base 9a would be inserted into the aperture 6 until it engages the walls of the aperture, at which point the frictional engagement holds base 9a within base 4. As indicated above, the walls defining aperture 6 may have a rough surface or be lined with rubber to increase the frictional hold of the base 4 on the cosmetic base 9a. FIG. 7 is an alternative embodiment capable of accepting bases 9a of different sizes, but includes the use of channels 7 cut into the walls of aperture 6 to soften and allow movement within said walls to create further frictional engagement between a cosmetic base 9a and base 4.

The present invention provides a lightweight and easy to use cosmetic magnifying mirror which is always available when mascara or other cosmetics are to be applied. Additionally, when the cosmetic container is empty, the cosmetic base 9a may be removed from the magnifying lens or mirror base 4 and the cosmetic magnifying lens or mirror 10 may be used with a new mascara container. Alternatively, while the invention has been described with reference to mascara containers, it is understood that the present invention may be used with other cosmetics. For example, lip gloss and lipstick typically include a base including the cosmetic and an applicator. It is understood that the aperture 6 as described above may be sized to accept the base of such lip glosses and lipsticks to allow easy and readily accessible viewing when such cosmetics are applied by the applicator.

Although the invention has been described in detail herein, it should be understood that the invention is not limited to the embodiments herein disclosed. Various changes, substitutions and modifications may be made to the disclosure by those skilled in the art without departing from the spirit or scope of the invention.

What is claimed is:

1. A cosmetic magnifying device for affixing to a cosmetic base portion of a cosmetics container with a removable cap, said device comprising:
    a device base having an aperture formed at least partially there through, the aperture having a shape customized to fit and receive the cosmetic base portion of the cosmetics container; and
    a frame mounted to the device base by a stem and stem base, said frame housing a magnifying lens mounted in the frame by way of a groove;
    wherein said aperture of said device base comprises a pliable interior lining that creates sufficient frictional hold on said cosmetic base portion of the cosmetics container to grip securely onto said cosmetic base portion of the cosmetics container, while still allowing said cosmetic magnifying device to be capable of being detached from a first cosmetics container and reused with a second cosmetics container.

2. A cosmetic magnifying device as recited in claim 1, wherein the base and frame are formed at least partially of cardboard covered with paper.

3. A cosmetic magnifying device as recited in claim 1, wherein the base and frame are formed at least partially of plastic.

4. A cosmetic magnifying device as recited in claim 1, wherein a diameter of the aperture changes along a length of the aperture to allow the base to fit and receive portions of the cosmetics containers of different sizes.

5. A cosmetic magnifying device as recited in claim 1, wherein the cosmetic container is a mascara carrier, and wherein the brush-like mascara wand is in the removable cap.

6. A cosmetic magnifying device as recited in claim 1, wherein the cosmetic container is a lip gloss or lipstick carrier.

7. A cosmetic magnifying device as recited in claim 1, wherein the object to which the device is attached is any cosmetic related container, product, or tool.

8. A cosmetic magnifying device for affixing to a cosmetic base portion of a cosmetics container with a removable cap, said device comprising:

a base having an aperture formed at least partially there through, the aperture having a shape customized to fit and receive the cosmetic base portion of the cosmetics container; and a frame mounted to the device base by a stem and stem base, said frame housing a magnifying mirror mounted in the frame by way of a groove;

wherein said aperture of said base comprises a pliable interior lining that creates sufficient frictional hold on said portion of the cosmetics container to grip securely onto said portion of said cosmetics container, while still allowing said cosmetic magnifying device to be capable of being detached from a first cosmetics container and reused with a second cosmetics container.

9. A cosmetic magnifying device as recited in claim 8, wherein the base and frame are formed at least partially of cardboard covered with paper.

10. A cosmetic magnifying device as recited in claim 8, wherein the base and frame are formed at least partially of plastic.

11. A cosmetic magnifying device as recited in claim 8, wherein a diameter of the aperture changes along a length of the aperture to allow the base to fit and receive portions of the cosmetics containers of different sizes.

12. A cosmetic magnifying device as recited in claim 8, wherein the cosmetic container is a mascara carrier, and wherein the brush-like mascara wand is in the removable cap.

13. A cosmetic magnifying device as recited in claim 8, wherein the cosmetic container is a lip gloss or lipstick carrier.

14. A cosmetic magnifying device as recited in claim 8, wherein the object to which the device is attached is any cosmetic related container, product, or tool.

15. The device of claim 1, wherein said lens has a magnifying power of 2×.

16. The device of claim 8, wherein said mirror has a magnifying power of 2×.

17. The device of claim 1, wherein channels are cut into the walls of said aperture to soften and allow movement within said walls to create better frictional engagement between said cosmetic base and said device base.

18. The device of claim 8, wherein channels are cut into the walls of said aperture to soften and allow movement within said walls to create better frictional engagement between said cosmetic base and said device base.

19. A cosmetic magnifying device for affixing to a cosmetic base portion of a cosmetics container with a removable cap comprising a brush-like mascara wand, said device comprising:

a base having an aperture formed at least partially there through, the aperture having a shape customized to fit and receive the cosmetic base portion of the cosmetics container;

a frame mounted to the device base by a stem and stem base, said frame housing a 2× magnifying minor mounted in the frame by way of a groove; and wherein said aperture of said base comprises a pliable interior lining with channels cut into the walls of said aperture to soften and allow movement within said walls that creates sufficient frictional hold on said portion of the cosmetics container to grip securely onto said portion of said cosmetics container, while still allowing said cosmetic magnifying device to be capable of being detached from a first cosmetics container and reused with a second cosmetics container.

20. The cosmetic magnifying device as recited in claim 19, wherein a diameter of said aperture changes along a length of the aperture to allow the base to fit and receive base portions of the cosmetics containers of different sizes.

* * * * *